US 11,210,722 B2

(12) United States Patent
Tseng et al.

(10) Patent No.: US 11,210,722 B2
(45) Date of Patent: Dec. 28, 2021

(54) ADAPTIVE VEHICLE FEATURE MATCHING SYSTEM

(71) Applicant: Ford Global Technologies, LLC, Dearborn, MI (US)

(72) Inventors: Fling Tseng, Ann Arbor, MI (US); Aed Dudar, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 176 days.

(21) Appl. No.: 16/387,086

(22) Filed: Apr. 17, 2019

(65) Prior Publication Data

US 2020/0334732 A1 Oct. 22, 2020

(51) Int. Cl.
*G06Q 30/00* (2012.01)
*G06Q 30/06* (2012.01)
*B60W 40/09* (2012.01)
*G06Q 50/30* (2012.01)

(52) U.S. Cl.
CPC ........ *G06Q 30/0631* (2013.01); *B60W 40/09* (2013.01); *G06Q 30/0627* (2013.01); *G06Q 30/0645* (2013.01); *G06Q 50/30* (2013.01)

(58) Field of Classification Search
CPC .......... G06Q 30/0623; G06Q 30/0627; G06Q 30/0631; G06Q 30/0645; G06Q 50/30; B60W 40/09
See application file for complete search history.

(56) References Cited

U.S. PATENT DOCUMENTS

| 9,193,358 | B2 | 11/2015 | Lee et al. | |
|---|---|---|---|---|
| 2006/0217935 | A1 | 9/2006 | Beiermeister et al. | |
| 2013/0275214 | A1* | 10/2013 | Kote | G06Q 30/0255 705/14.53 |
| 2014/0129080 | A1* | 5/2014 | Leibowitz | G06Q 30/0631 701/33.3 |
| 2014/0309855 | A1* | 10/2014 | Tran | B60Q 1/38 701/36 |
| 2014/0309885 | A1* | 10/2014 | Ricci | G01C 21/3697 701/41 |
| 2015/0166072 | A1* | 6/2015 | Powers | G08G 1/0129 701/1 |
| 2015/0170253 | A1* | 6/2015 | Kim | G06Q 30/0631 705/26.7 |

(Continued)

OTHER PUBLICATIONS

AutoTrader.com Enhances Customization of Popular Consumer Site Feature, Apr. 11, 2007, Business Wire (Year: 2007).*

(Continued)

*Primary Examiner* — Matthew E Zimmerman
(74) *Attorney, Agent, or Firm* — Frank Lollo; Brooks Kushman P.C.

(57) ABSTRACT

A server includes a memory configured to store a vehicle feature usage pattern and data associated with a trip; and processor, programmed to responsive to receiving a vehicle selection request for a user, predict a driving condition of the vehicle used by the user during the trip; calculate a usage score for each of a plurality of predefined vehicle safety features based on the vehicle feature usage pattern of the user and the driving condition as predicted; and select, from a plurality of vehicles, one or more vehicles as candidate vehicles based on the usage score as calculated.

12 Claims, 5 Drawing Sheets

(56) References Cited

U.S. PATENT DOCUMENTS

2016/0198306 A1\* 7/2016 Miles ................ G06Q 10/0639
　　　　　　　　　　　　　　　　　　　　　　455/456.3
2019/0012603 A1　 1/2019 Miller et al.
2020/0118202 A1\* 4/2020 Honma ................ G06Q 50/30

OTHER PUBLICATIONS

White, Rebecca. "GM expands availability of rear seat reminder technology." (2016). (Year: 2016).\*

\* cited by examiner

ADAPTIVE VEHICLE FEATURE MATCHING SYSTEM

TECHNICAL FIELD

The present disclosure generally relates to an adaptive vehicle feature matching system. More specifically, the present disclosure relates to a system for learning a usage pattern for various vehicle feature of a user over time.

BACKGROUND

Many modern vehicles are provided with various safety and comfort features to provide a better user experience. For instance, a blind spot monitor system may remind the user of potential danger at the blind spot before switching lanes by outputting a warning (e.g. via a light indicator). When the same user who has got used to the blind spot monitor system switches to a new vehicle (e.g. a rental car) which is not equipped with such feature, it may cause inconvenience and sometimes even dangerous situations. Continuing to use the above example, the user may mistake the absence of warning sign as an indication that it is safe to switch lanes, while in fact the new vehicle is not provided with the blind spot monitor feature.

SUMMARY

In one or more illustrative embodiment of the present disclosure, a server includes a memory configured to store a vehicle feature usage pattern and data associated with a trip; and processor, programmed to responsive to receiving a vehicle selection request for a user, predict a driving condition of the vehicle used by the user during the trip; calculate a usage score for each of a plurality of predefined vehicle safety features based on the vehicle feature usage pattern of the user and the driving condition as predicted; and select, from a plurality of vehicles, one or more vehicles as candidate vehicles based on the usage score as calculated.

In one or more illustrative embodiment of the present disclosure, a vehicle includes a memory storing user profiles; and a controller, programmed to responsive detecting a user starting to use the vehicle, associate the user with one of the user profiles that corresponds to the user; collect a vehicle safety feature usage data from an electronic control unit; collect location data from a global navigation satellite system controller; compile the vehicle safety feature usage data and the location data to calculate a vehicle safety feature usage pattern as a part of the user profile; and synchronize the user profile that corresponds to the user with a server.

In one or more illustrative embodiment of the present disclosure, a method includes loading a vehicle feature usage pattern and a trip data associated with a user; predicting a driving condition for the user during the trip; calculating usage scores for a plurality of predefined vehicle safety features based on the vehicle feature usage pattern and the driving condition as predicted; and selecting from a plurality of vehicles, one or more vehicles as candidate vehicles based on the usage scores as calculated.

BRIEF DESCRIPTION OF THE DRAWINGS

For a better understanding of the invention and to show how it may be performed, embodiments thereof will now be described, by way of non-limiting example only, with reference to the accompanying drawings, in which.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The present disclosure generally provides for a plurality of circuits or other electrical devices. All references to the circuits and other electrical devices, and the functionality provided by each, are not intended to be limited to encompassing only what is illustrated and described herein. While particular labels may be assigned to the various circuits or other electrical devices, such circuits and other electrical devices may be combined with each other and/or separated in any manner based on the particular type of electrical implementation that is desired. It is recognized that any circuit or other electrical device disclosed herein may include any number of microprocessors, integrated circuits, memory devices (e.g., FLASH, random access memory (RAM), read only memory (ROM), electrically programmable read only memory (EPROM), electrically erasable programmable read only memory (EEPROM), or other suitable variants thereof) and software which co-act with one another to perform operation(s) disclosed herein. In addition, any one or more of the electric devices may be configured to execute a computer-program that is embodied in a non-transitory computer readable medium that is programmed to perform any number of the functions as disclosed.

The present disclosure, among other things, proposes an adaptive vehicle feature matching system. More specifically, the present disclosure proposes a vehicle system configured to learn a feature usage pattern of a user and match the usage pattern with new candidate vehicles.

Figure 1:
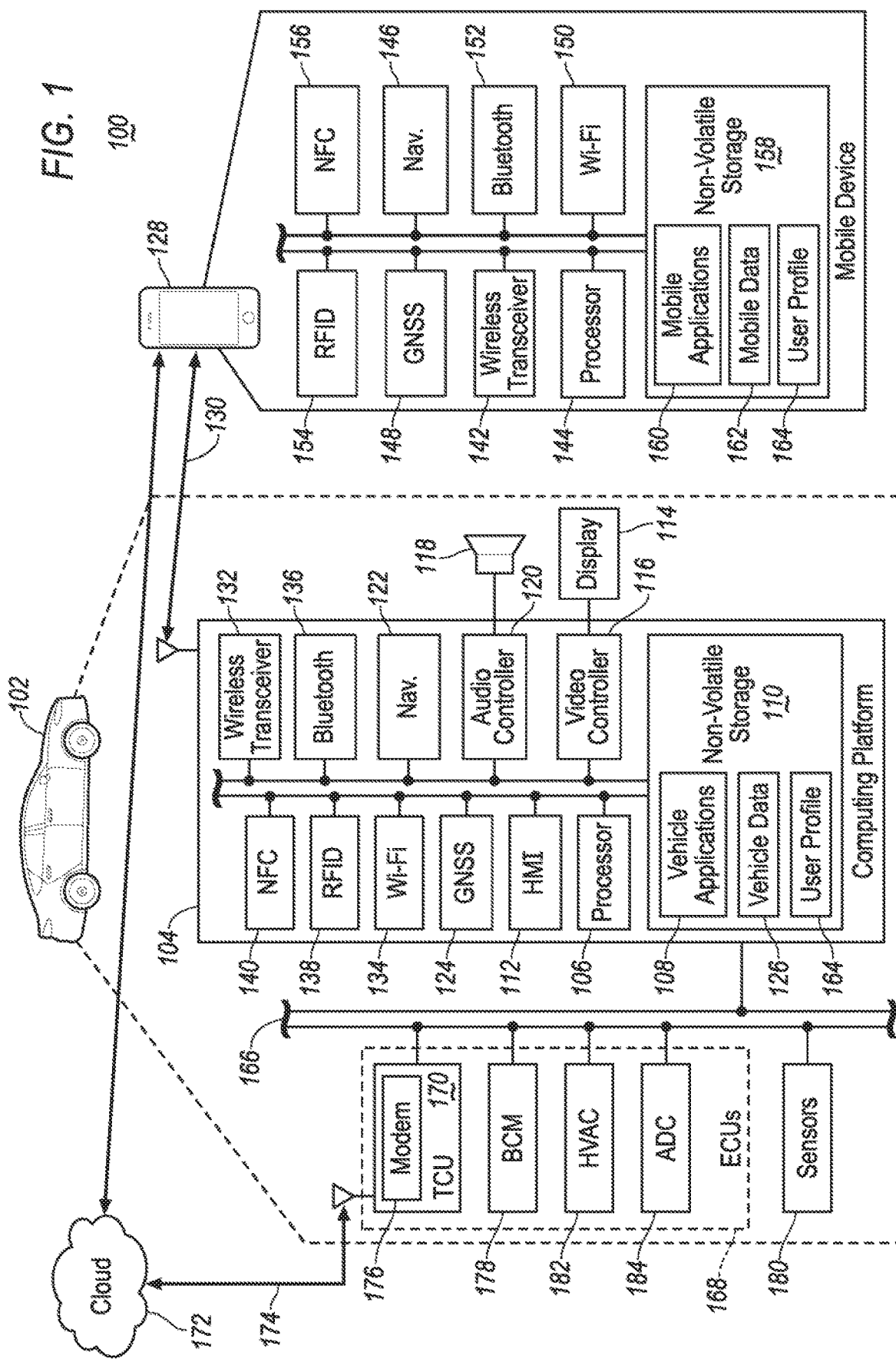
FIG. 1 illustrates an example block topology of a vehicle system of one embodiment of the present disclosure.

Referring to FIG. 1, an example block topology of a vehicle system 100 of one embodiment of the present disclosure is illustrated. A vehicle 102 may include various types of automobile, crossover utility vehicle (CUV), sport utility vehicle (SUV), truck, recreational vehicle (RV), boat, plane, or other mobile machine for transporting people or goods. In many cases, the vehicle 102 may be powered by an internal combustion engine. As another possibility, the vehicle 102 may be battery electric vehicle (BEV), a hybrid electric vehicle (HEV) powered by both an internal combustion engine and one or move electric motors, such as a series hybrid electric vehicle (SHEV), a parallel hybrid electric vehicle (PHEV), or a parallel/series hybrid vehicle (PSHEV), a boat, a plane or other mobile machine for transporting people or goods. As an example, the system 100 may include the SYNC system manufactured by The Ford Motor Company of Dearborn, Mich. It should be noted that the illustrated system 100 is merely an example, and more, fewer, and/or differently located elements may be used.

As illustrated in FIG. 1, a computing platform 104 may include one or more processors 106 configured to perform instructions, commands, and other routines in support of the processes described herein. For instance, the computing platform 104 may be configured to execute instructions of vehicle applications 108 to provide features such as navigation, vehicle data collection, and wireless communications. Such instructions and other data may be maintained in a non-volatile manner using a variety of types of computer-readable storage medium 110. The computer-readable medium 110 (also referred to as a processor-readable medium or storage) includes any non-transitory medium (e.g., tangible medium) that participates in providing instructions or other data that may be read by the processor 106 of the computing platform 104. Computer-executable instructions may be compiled or interpreted from computer programs created using a variety of programming languages and/or technologies, including, without limitation, and either alone or in combination, Java, C, C++, C#, Objective C, Fortran, Pascal, Java Script, Python, Perl, and PL/SQL.

The computing platform 104 may be provided with various features allowing the vehicle occupants/users to interface with the computing platform 104. For example, the computing platform 104 may receive input from human-machine interface (HMI) controls 112 configured to provide for occupant interaction with the vehicle 102. As an example, the computing platform 104 may interface with one or more buttons (not shown) or other HMI controls configured to invoke functions on the computing platform 104 (e.g., steering wheel audio buttons, a push-to-talk button, instrument panel controls, etc.).

The computing platform 104 may also drive or otherwise communicate with one or more displays 114 configured to provide visual output to vehicle occupants by way of a video controller 116. In some cases, the display 114 may be a touch screen further configured to receive user touch input via the video controller 116, while in other cases the display 114 may be a display only, without touch input capabilities. The computing platform 104 may also drive or otherwise communicate with one or more speakers 118 configured to provide audio output to vehicle occupants by way of an audio controller 120.

The computing platform 104 may also be provided with navigation and route planning features through a navigation controller 122 configured to calculate navigation routes responsive to user input via e.g., the HMI controls 112, and output planned routes and instructions via the speaker 118 and the display 114. Location data that is needed for navigation may be collected from a global navigation satellite system (GNSS) controller 124 configured to communicate with multiple satellites and calculate the location of the vehicle 102. The GNSS controller 124 may be configured to support various current and/or future global or regional location systems such as global positioning system (GPS), Galileo, Beidou, Global Navigation Satellite System (GLONASS) and the like. Map data used for route planning may be stored in the storage 110 as a part of the vehicle data 126. Navigation software may be stored in the storage 110 as a part of the vehicle applications 108.

The computing platform 104 may be configured to wirelessly communicate with a mobile device 128 of the vehicle users/occupants via a wireless connection 130. The mobile device 128 may be any of various types of portable computing device, such as cellular phones, tablet computers, wearable devices, smart watches, laptop computers, portable music players, or other device capable of communication with the computing platform 104. A wireless transceiver 132 may be in communication with a Wi-Fi controller 134, a Bluetooth controller 136, a radio-frequency identification (RFID) controller 138, a near-field communication (NFC) controller 140, and other controllers such as a Zigbee transceiver, an IrDA transceiver (not shown), and configured to communicate with a compatible wireless transceiver 142 of the mobile device 128.

The mobile device 128 may be provided with a processor 144 configured to perform instructions, commands, and other routines in support of the processes such as navigation, telephone, wireless communication, and multi-media processing. For instance, the mobile device 128 may be provided with location and navigation functions via a navigation controller 146 and a GNSS controller 148. The mobile device 128 may be provided with a wireless transceiver 142 in communication with a Wi-Fi controller 150, a Bluetooth controller 152, a RFID controller 154, an NFC controller 156, and other controllers (not shown), configured to communicate with the wireless transceiver 132 of the computing platform 104. The mobile device 128 may be further provided with a non-volatile storage 158 to store various mobile application 160 and mobile data 162. The storage 158 may be further configured to store a user profile 164 associated with a user of the mobile device 128. The user profile 164 may be include various attributes of the user. For instance, the user profile 164 may include a vehicle feature usage pattern indicative of how often the user uses various vehicle features such as the adaptive cruise control (ACC), blind spot monitoring (BSM), or the like. The user profile 164 may be shared and stored elsewhere such as the storage 110 of the vehicle 102.

The computing platform 104 may be further configured to communicate with various components of the vehicle 102 via one or more in-vehicle network 166. The in-vehicle network 166 may include, but is not limited to, one or more of a controller area network (CAN), an Ethernet network, and a media-oriented system transport (MOST), as some examples.

The computing platform 104 may be configured to communicate with various ECUs 168 of the vehicle 102 configured to perform various options. For instance, the computing platform may be configured to communicate with a TCU 170 configured to control telecommunication between vehicle 102 and a cloud 172 through a wireless connection 174 using a modem 176. The wireless connection 174 may be in the form of various communication network e.g. a cellular network. As an example, the user profile 164 associated with a vehicle user may be primarily stored in the cloud and shared with the mobile device 128 and the vehicle 102. Responsive to receiving any changes in the user profile 164, the mobile device 128 and/or the vehicle 102 may perform synchronization with the cloud 172 to update the user profile 164. The term cloud is used as a general term in the present disclosure and may include any computing network involving computers, servers, controllers or the like configured to store data and perform data processing functions and facilitate communication between various entities.

The ECUs 168 may further include a body control module (BCM) 178 configured to monitor and control body operations of the vehicle 102. For instance, the BCM 178 may be configured to control and monitor body and safety features such as door lock/unlock, seatbelt warning, vehicle occupancy, blind spot monitoring (BSM) system or the like using signals detected via one or more sensors 180 (to be described in detail below). The ECUs 168 may further include a heating ventilation and air conditioning (HVAC) controller 182 configured to operate a climate control system including seat heating/cooling features for the interior of the vehicle 102. The ECUs 168 may further include an autonomous driving controller (ADC) 184 configured to monitor and control the autonomous driving features of the vehicle 102. Some autonomous driving feature may include lane keep assist, safe distance from other vehicles, cruise control, adaptive cruise control (ACC), hands-off-wheel alert, autobraking, brake mitigation with multiple sensitivity levels or the like.

The sensors 180 may be include various types of sensors configured to perform various detections. As a few non-limiting examples, the sensors 180 may include one or more cameras configured to capture images inside the vehicle cabin or of the vicinity of the vehicle 102. The camera 180 may be located behind the windshield of the vehicle 102 facing forward to capture an image in front of the vehicle 102. Alternatively, the front-facing camera 180 may be installed elsewhere, such as on the grille, inside the engine bay or on top of the vehicle 102. Additionally or alternatively, the camera 180 may be located at the back of the vehicle 102 to function as a backup camera. Additionally or alternatively, the camera 180 may be a surrounding view camera including multiple camera sensors configured to capture multiple images around the vehicle 102 and generate a surrounding view around the vehicle 102. The camera 180 may be configured to switch on automatically, e.g., responsive to the start/activation of the vehicle 102. Alternatively, the camera 180 may be manually switched on/off by a vehicle user using the input device by way of the HMI controls 112. The image data captured by the camera 180 may be fed into the computing platform 104 via the in-vehicle network 166 and processed by the processor 106 using software 108. Additionally, image and video captured by the camera 180 may be fed into the ADC 184 for autonomous driving processing.

The sensors 180 may further include one or more ultrasonic sensors installed on the body of the vehicle 102 (e.g. on the front/rear bumper) configured to detect objects within their range and calculate the distance from the objects. The sensors 180 may further include a radar sensor configured to detect object detect object within a predefined range from the vehicle 102 to facilitate distance measurement by the computing platform 104. The radar sensor 180 may have a longer range than the ultrasonic sensors 180 and may be configured to detect metal object only. The sensors 180 may further include a lidar sensor configured to detect and measure objects within a predefined range from the vehicle 102. The lidar sensor 180 may be configured to function substantially in the same way as the radar sensor 180 operates, but the lidar sensor may remove the requirement for the object to be metal.

Figure 2:
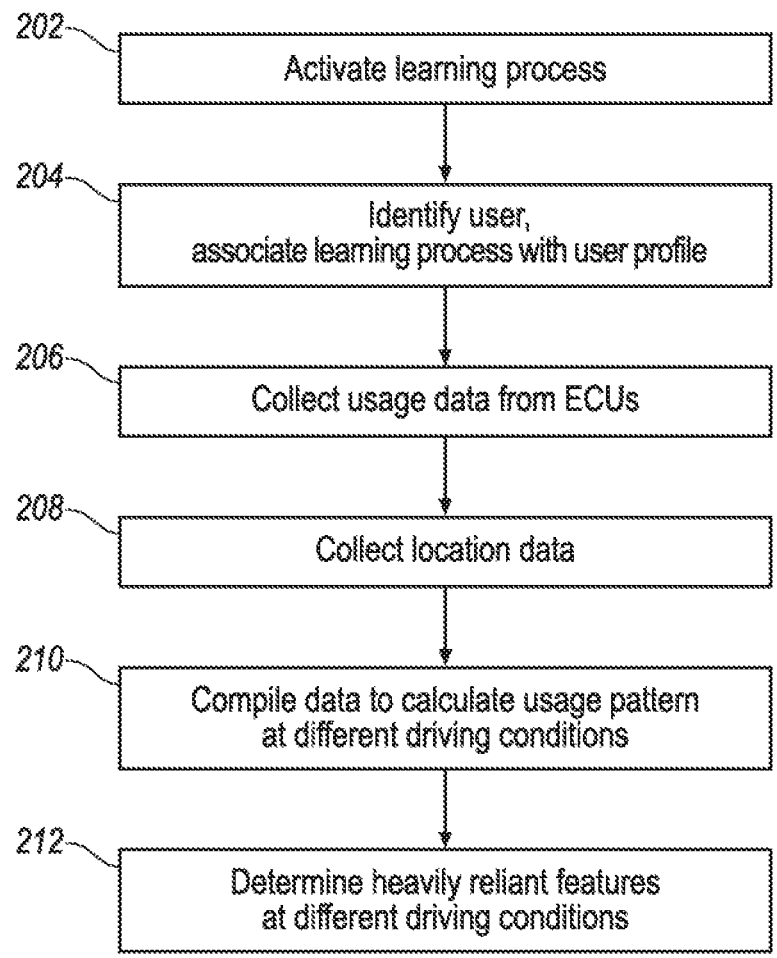
FIG. 2 illustrates an example flow diagram for a vehicle feature learning process of one embodiment of the present disclosure.

Referring to FIG. 2, an example flow diagram for a vehicle feature usage learning process 200 of one embodiment of the present disclosure is illustrated. At operation 202, the computing platform 104 activates the vehicle feature usage learning process enabled by vehicle applications 108. The vehicle feature usage learning process may automatically activate responsive to the computing platform 104 detecting a user starts to use the vehicle 102. Alternatively, the computing platform 104 may be configured to activate the process responsive to receiving a user input via the HMI controls 112 requesting to perform such process. At operation 204, the computing platform 104 identifies the user and associates the learning process with the user profile 164 of the identified user. The identification may be performed via the mobile device 128 associated with the user connecting to the computing platform 104. Alternatively, the user may be identified via biometric means using a fingerprint and facial recognition technologies. Alternatively, the user may be further identified through the HMI controls 112 by manually inputting a personal identification number (PIN) or the like that is uniquely associated with the user.

Responsive to a successful user identification, at operation 206, the computing platform 104 starts to collect usage data for various vehicle features from ECUs 168. The vehicle features may be divided into two categories including safety features and comfort features. As few non-limiting examples, the safety features may include BSM via the BCM 178, ACC via the ADC 184, lane keeping assist via the ADC, and/or collision warning via the BCM 178. The comfort features may include climate controls via the HVAC 182, seat heating via the HVAC 182, radio and entertainment via the computing platform 104. If the vehicle 102 is operated by a human driver, i.e. the user, the computing platform 104 may collect the usage data for both the safety features and comfort features. Otherwise, if the vehicle 102 is operated via the ADC 184 without human involvement while driving, the computing platform 104 may be configured to only collect the comfort feature usage data. At operation 208, the computing platform 104 collect location data e.g. from the GNSS controller 124 to determine the road/driving condition of the vehicle 102. Additionally, weather conditions may also affect the usage pattern of vehicle features. The weather data may be collected from the cloud 172 using the location data from the GNSS 124.

At operation 210, the computing platform 104 compiles the vehicle feature usage data with the driving condition data to calculate the usage pattern of the user at different driving conditions. The driving condition may include various types of conditions involved in the operations of the vehicle 102. As a few non-limiting examples, the driving condition may include types of road (e.g. highway, city road), traffic, weather, temperature, time of the day, and/or season. When operated by the human driver, usage pattern for the vehicle safety features may vary depending on the driving condition. For instance, depending on the specific user, the ACC feature may be more often used in the highway and/or low traffic condition, whereas the blind spot monitor system may be more often used in the city and/or congested traffic condition. At operation 212, the computing platform 104 determines heavily reliant vehicle features at different driving conditions based on the usage pattern as compiled.

Figure 3:
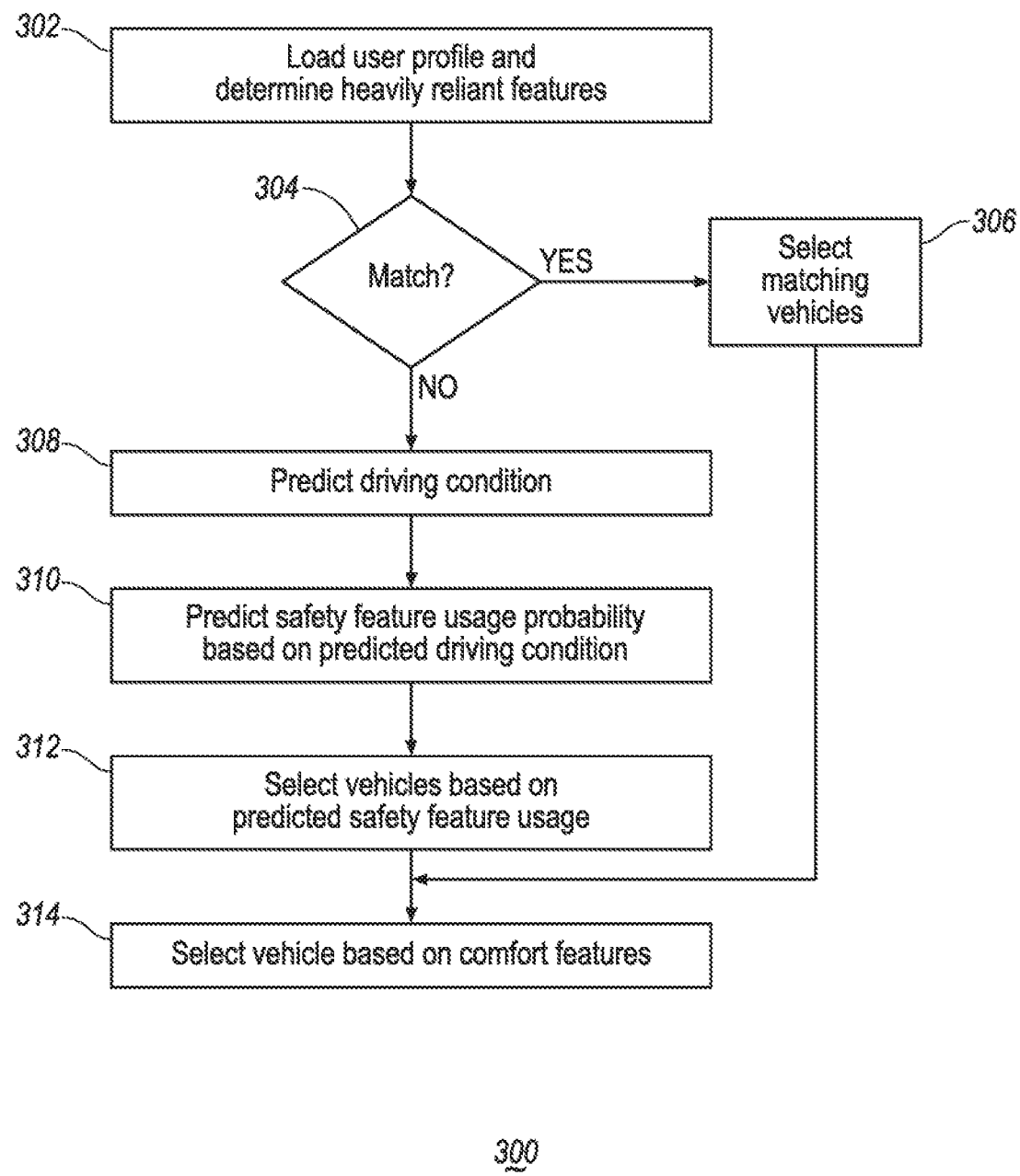
FIG. 3 illustrates an example flow diagram for a vehicle selecting process based on vehicle features of one embodiment of the present disclosure.

Referring to FIG. 3, an example flow diagram of a process 300 for selecting a vehicle based on the vehicle feature usage pattern of the user is illustrated. The process 300 may be applied to various situations such as a vehicle renting scenario where the user would like to rent a vehicle for temporary use. A cloud server 172 may be configured to select a vehicle that matches heavily reliant safety features of the user as much as possible. Alternatively, the process 300 may be performed by the vehicle 102 or the mobile device 128 under substantially the same principle. At operation 302, the cloud server 172 loads the user profile 164 and determines heavily reliant safety features of the user. The user profile 164, as discussed above, may be stored in the cloud 172 synchronized with the computing platform 104 and the mobile device 128. In case that a newer version of the user profile 164 is detected in the computing platform 104 and/or the mobile device 128 and has not been synchronized with the cloud 172, the cloud server 172 may use the newer version of the user profile 164 by synchronizing to the cloud 172 first. At operation 304, the cloud server 172 verifies if there are one or more vehicles that match all the heavily reliant safety features of the user. If the answer is a yes, the process proceeds to operation 306 and the cloud server 172 selects the matching one or more vehicles. Then the process proceeds to operation 314 to further select based comfort features (to be described in detail below).

If the cloud server 172 fails to find a match at operation 304, the process proceeds to operation 308 and the cloud server 172 predicts driving conditions for the new vehicles to make further selections. The prediction of driving conditions may be performed based on various factors. Following the above rental vehicle scenario for example, the cloud server 172 may use the user trip information including vehicle pickup and return locations to predict driving conditions of the rental vehicle (e.g. highway, or city driving). Additionally, the server 172 may be further configured to access a calendar of the user (if available) including scheduled event locations and time of the user to further determine the trip information and predict driving conditions (e.g. congestions). Additionally, the server 172 may be further configured to access weather reports at the location of the new vehicle to predict weather condition while the user uses the vehicle. With the predicted driving condition, at operation 310, the cloud server 172 predicts a usage probability for each safety feature for the predicted driving condition using the feature usage pattern from the user profile 164. At operation 312, the cloud server 172 selects one or more vehicles equipped with safety features with high usage probabilities as predicted. All vehicles selected at operation 312 may be qualified as candidate vehicles for further selection at operation 314, where the cloud server 172 further select the vehicles based on comfort features desired by the user from the user profile 164. The cloud server 172 may select one or more vehicles from the candidate vehicles having the comfort features that are heavily used by the user. For instance, the candidate vehicles may be provided with different comfort features such as seat heating/cooling, satellite radio or the like. The cloud server 172 may choose from the candidate vehicles based on the most often used comfort features of the user. If more than one vehicles are selected, the cloud server 172 may further ask for a user input to make a final selection for one vehicle. The cloud 172 may be further configured to remind the user when the user enters and starts to use the selected vehicle about the missing features, especially for those safety features. For instance, the computing platform 104 of the vehicle 102 may be configured to output the reminder via the display 114 and/or the speaker 118 responsive to a request from the server 172 to remind the user that the current vehicle is not provided with some features that the user is used to (e.g. BSM) to prevent inconvenience and misunderstanding.

Figure 4:
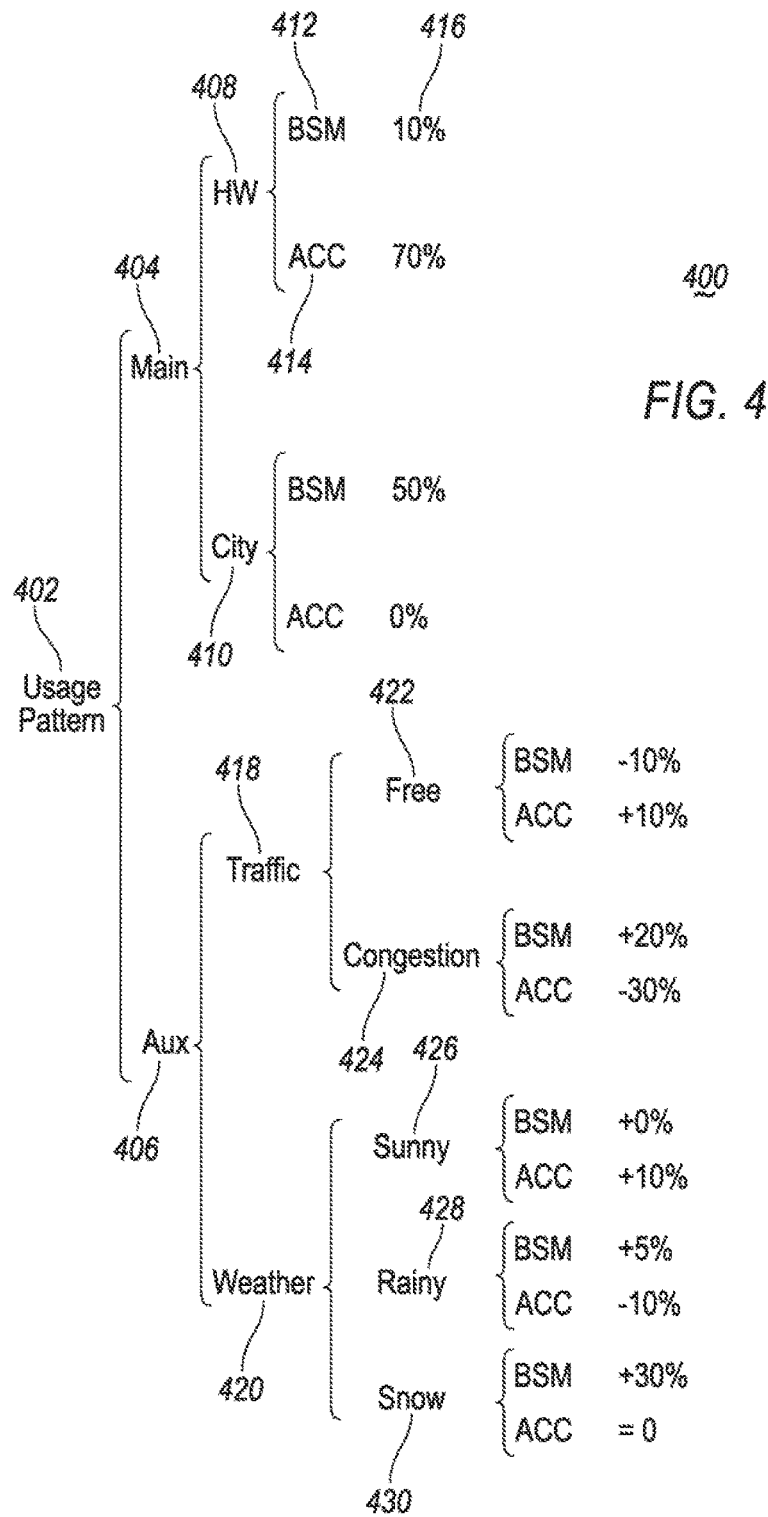
FIG. 4 illustrates an example diagram for a vehicle safety feature usage pattern of a user of one embodiment of the present disclosure.

The operations of process 300 may be applied to various situations. Referring to FIG. 4, an example diagram for a vehicle safety feature usage pattern 402 of a user is illustrated. The usage pattern 402 may be a part of the user profile 164 associated with the user. As an example, the usage pattern 402 may be divided into a main driving condition 404 and an auxiliary driving condition 406. The main driving condition 404 may generally include a highway condition 408 and a city condition 410. Each condition may be associated with multiple safety feature usage data. For instance, in the highway driving condition 408, a BSM feature 412 may have a usage score of 10% and an ACC feature 414 may have a usage score of 70%. In this case, the ACC feature 414 having the highest usage score classified a heavily reliant feature in highway driving condition 408 for the user. The city driving condition 410 may be associated with a usage score of 50% for BSM and a 0% usage score for ACC. Therefore, the BSM feature 412 having the highest score is the heavily reliant feature for the city driving condition 410. As discussed above, although the vehicle 102 may be provided with more safety features, only the BSM and ACC features are used on the present example for the sake of simplicity. As described with reference to FIG. 2, the usage score associated with each safety feature is generated and updated via e.g. the computing platform 104 based on ECU data indicative of usage rate for those features in different driving conditions. It is noted that the usage score associated with each vehicle safety feature is only an example score calculated using predefined algorithm for illustration purposes, and the usage score may not suggest actual statistics for usage rate. Furthermore, although the usage score is presented in percentile, different quantification systems may be used to evaluate the usage score.

The main driving condition 404 may be affected by various auxiliary driving conditions 406. For instance, the auxiliary driving conditions 406 may include a traffic condition 422 and a weather condition 420 as a few non-limiting examples, and each condition may affect usage score 416 for vehicle safety features based on the main driving condition 404. The traffic condition 418 may be divided into free-flow traffic 422 and congestion traffic 424 each affecting the BSM and ACC usage score. Taking the free-flow traffic condition 422 for instance, the BSM usage score 412 is reduced by 10% where as the ACC usage score 414 is increased by 10%. This may be caused by the fact that the user is less likely to use the BSM but more likely to use the ACC during free-flow traffic condition. The auxiliary condition 406 may further include weather conditions 420 affecting the usage score 416 under different traffic conditions. The weather conditions may generally include a sunny weather 426, rain 428, and snow 430, each affecting the usage score 416 just like what the traffic conditions 418 do. It is noted that during a snow 430, the ACC usage score may be directly set to zero (0) because it may be unsafe to use such feature in the snow. It is noted that there may be various ways to organize the usage pattern 402, and the example as illustrated with reference to FIG. 4 is merely an example.

Figure 5:
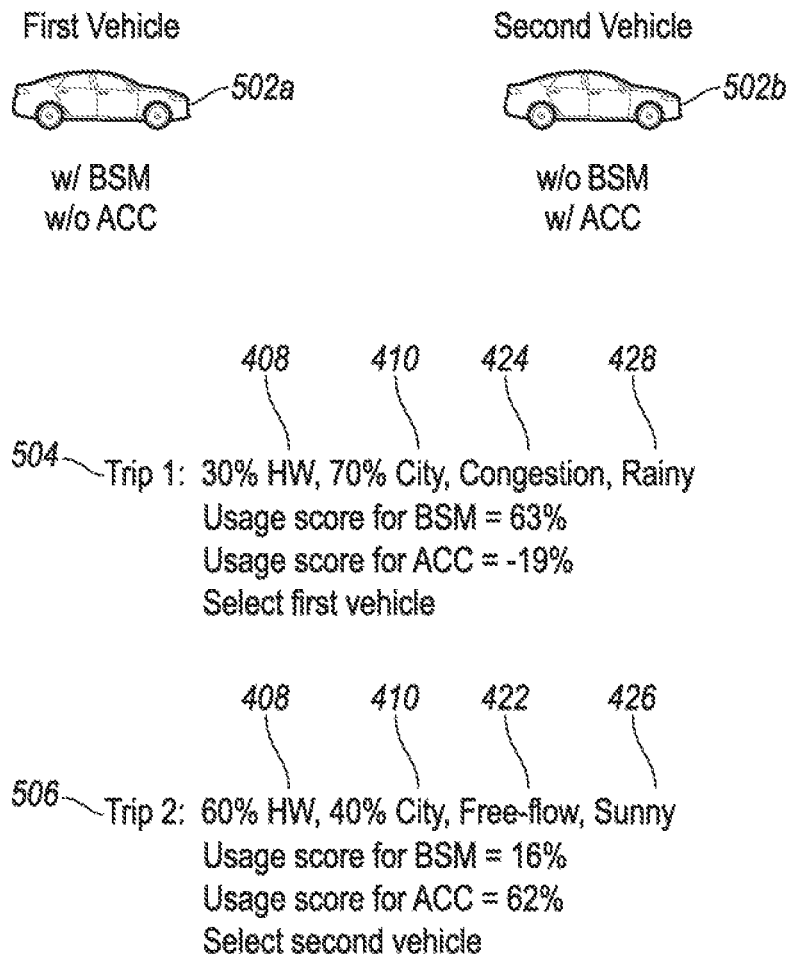
FIG. 5 illustrates an example diagram for selecting vehicles of one embodiment of the present disclosure.

The usage pattern 402 may be used to select a new vehicle for the user by matching the heavily reliant feature with the available features of new vehicles. Referring to FIG. 5, a diagram 500 illustrating a vehicle selecting process based on vehicle features of one embodiment of the present disclosure is illustrated. In the present example, two rental vehicle 502a and 502b are available. The first vehicle 502a is provided with BSM but no ACC, whereas the second vehicle 504 is provided with ACC but no BSM. The cloud server 172 may be configured to retrieve travel information of the user to calculate usage probabilities/scores of vehicle safety features to better select the vehicle. For instance, if cloud server 172 predicts a first trip 504 having the driving condition of 30% highway 408 and 70% city driving 410, with a generally congested traffic 424 and rainy weather forecast 428, the cloud server 172 may take all the above factors into account to calculate the usage score of the BSM 412 and ACC 414 features. The usage score for each feature may be calculated using the equation below:

$$\text{Usage Score} = HW(\text{Main}+\text{Aux}) + \text{City}(\text{Main}+\text{Aux}) \quad (1)$$

Therefore, the usage scores for the BSM 412 and ACC 414 may be calculated using the number illustrated in FIG. 4 below:

$$BSM\ \text{Score} = 30\% \times (10\% + 20\% + 5\%) + 70\% \times (50\% + 20\% + 5\%) = 63\%$$

$$ACC\ \text{Score} = 30\% \times (70\% - 30\% - 10\%) + 70\% \times (0\% - 30\% - 10\%) = -19\%$$

Since the calculated usage score for BSM feature 412 is greater than the score for ACC feature 414, the BSM 412 is classified as a more heavily reliant feature for the new vehicle selection process. Therefore, the first vehicle having the BSM feature 412 may be selected in the present trip.

On the other hand, of the cloud server 172 predicts a second trip 506 having the driving condition of 60% highway 408 and 40% city driving 410, with a generally free-flow traffic 422, and sunny weather 426, the usage scores for the BSM 412 and ACC 414 may be calculated below:

$$BSM\ \text{Score} = 60\% \times (10\% - 10\% + 0\%) + 40\% \times (50\% - 10\% + 0\%) = 16\%$$

$$ACC\ \text{Score} = 60\% \times (70\% + 10\% + 10\%) + 40\% \times (0\% + 10\% + 10\%) = 62\%$$

Therefore, the second vehicle 502b provided with the ACC feature may be selected for the second trip 506.

The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A server, comprising:
    a memory configured to store a vehicle feature usage pattern and data associated with a trip; and
    a processor, programmed to
        responsive to receiving a vehicle selection request for a user, access a user calendar including at least one event at a location and time, and plan the trip using the location and time,
        determine a user profile indicative of a user reliant feature from the vehicle feature usage pattern;
        predict a driving condition during the trip;
        calculate usage scores for a plurality of predefined vehicle safety features based on the vehicle feature usage pattern of the user and the driving condition as predicted;
        select, from a plurality of vehicles, a candidate vehicle based on the usage scores as calculated;
        responsive to detecting the user reliant feature is missing on the candidate vehicles, generate a reminder to remind the user about an absence of the user reliant feature on the candidate vehicle;
        determine a vehicle occupancy using a control module; and
        responsive to determining the user has at least one of entered or started to use the candidate vehicle, instruct the candidate vehicle to output the reminder.

2. The server of claim 1, wherein the processor is further programmed to select the candidate vehicle based on a comfort feature preference of the user as a part of the vehicle feature usage pattern.

3. The server of claim 1, wherein the driving condition includes a main condition and an auxiliary condition.

4. The server of claim 3, wherein the main condition includes a type of road condition.

5. The server of claim 4, wherein the usage score is calculated by dividing the trip into different types of road condition proportionally based on the driving condition as predicted, and combining main condition and auxiliary condition for each of the different types of road condition.

6. The server of claim 4, wherein the auxiliary condition includes at least one of: a traffic condition, a weather condition, a temperature condition, time of the day, or a season condition.

7. The server of claim 1, wherein the predefined vehicle safety features include at least one of: blind spot monitor, lane keep assist, safe distance from other vehicles, cruise control, adaptive cruise control, hands-off-wheel alert, auto-braking, or brake mitigation.

8. The server of claim 1, wherein the processor is further programmed to synchronize the vehicle feature usage pattern with a vehicle and a mobile device.

9. A method, comprising:
    loading a vehicle feature usage pattern and a data for a trip associated with a user, wherein the vehicle feature usage pattern includes a user reliant feature;
    predicting a driving condition for the user during the trip;
    calculating usage scores for a plurality of predefined vehicle safety features based on the vehicle feature usage pattern and the driving condition as predicted;
    selecting from a plurality of vehicles, a candidate vehicle based on the usage scores as calculated;
    verifying features of the candidate vehicle against the user reliant feature;
    responsive to detecting the user reliant feature is missing on the candidate vehicle, generating a reminder to remind the user about an absence of the user reliant feature on the candidate vehicle;
    determining a vehicle occupancy using a control module; and
    responsive to determining the user has at least one of entered or started to use the candidate vehicle, instructing the candidate vehicle to output the reminder.

10. The method of claim 9, further comprising:
    selecting the candidate vehicle based on a comfort feature preference of the user as a part of the vehicle feature usage pattern.

11. The method of claim 9, wherein the predefined vehicle safety features include a blind spot monitor, and an adaptive cruise control.

12. The method of claim 9, wherein the driving condition includes a main condition and an auxiliary condition, the main condition includes a type of road condition, and the auxiliary condition includes at least one of: a traffic condition, a weather condition, a temperature condition, time of the day, or a season condition.

* * * * *